United States Patent

[11] 3,626,826

| [72] | Inventor | Johann Putscher<br>Munich, Germany |
|------|----------|-----------------------------------|
| [21] | Appl. No. | 71,184 |
| [22] | Filed | Sept. 10, 1970 |
| [45] | Patented | Dec. 14, 1971 |
| [73] | Assignee | Agfa-Gevaert Aktiengesellschaft<br>Leverkusen, Germany |
| [32] | Priority | Sept. 13, 1969 |
| [33] | | Germany |
| [31] | | P 19 46 533.9 |

[54] PHOTOGRAPHIC APPARATUS WITH ELECTRONIC EXPOSURE CONTROL MEANS
18 Claims, 2 Drawing Figs.

[52] U.S. Cl. ..................................... 95/10 CT,
                                              95/53 EA
[51] Int. Cl. ..................................... G03b 7/08
[50] Field of Search ........................ 95/10 C, 10
                                 CE, 10 CT, 10 CD, 53 E, 53 EA

[56] References Cited
UNITED STATES PATENTS

| 2,978,970 | 4/1961 | Fahlenberg ................... | 95/53 EA |
| 3,349,678 | 10/1967 | Suzuki et al. ................ | 95/10 CT |
| 3,466,993 | 9/1969 | Fahlenberg et al. .......... | 95/53 EA |

FOREIGN PATENTS

| 1,501,660 | 10/1967 | France ..................... | 95/10 CT |
| 1,154,340 | 9/1963 | Germany ................... | 95/10 CT |

Primary Examiner—Joseph F. Peters, Jr.
Attorney—Michael S. Striker

ABSTRACT: An electronic control for a shutter which respectively opens and closes on movement of a first and a second ring to uncocked position. The circuit of the exposure control has an electromagnet whose armature normally holds the rings in cocked positions and releases the first ring on actuation of the camera release. The second ring is released with a delay which is a function of scene brightness. The electromagnet has a permanent magnet core which is too weak to move the armature against the bias of a spring from a first retaining position in which both rings are held in cocked positions, and a winding which is energized in a first way on actuation of the camera release to assist the core in moving the armature to a second retaining position in which the armature holds only the second ring in cocked position whereby the shutter opens. The condition of energization of the winding is changed by a timer element with a delay which depends on scene brightness whereby the winding opposes the action of the core and enables the spring to displace the armature which releases the second ring to thus close the shutter.

INVENTOR
JOHANN PUTSCHER
BY

PHOTOGRAPHIC APPARATUS WITH ELECTRONIC EXPOSURE CONTROL MEANS

BACKGROUND OF THE INVENTION

The present invention relates to photographic apparatus with automatic exposure controls, and more particularly to improvements in photographic apparatus with automatic electronic exposure control means which determines the exposure time as a function of scene brightness. Still more particularly, the invention relates to improvements in photographic cameras with automatic electronic exposure control means wherein the timer element which determines the duration of exposure time as a function of scene brightness preferably comprises a capacitor and a photosensitive receiver and wherein the circuit of the exposure control means preferably contains a source of DC current.

It is already known to provide a photographic apparatus with a shutter one element of which is moved in response to actuation of the camera release to thereby open the shutter and another element of which is permitted to move with a delay which is a function of scene brightness to thereby close the shutter. The exposure control which determines the delay comprises an electric circuit which normally contains a source of DC current and the aforementioned combination of capacitor and photosensitive receiver which serves as a timer element of the circuit. A drawback of presently known exposure controls is that they consume considerable amounts of electrical energy and also that their circuitry contains a substantial number of parts which normally include several electromagnets.

SUMMARY OF THE INVENTION

An object of the invention is to provide a photographic apparatus with novel and improved electronic exposure control means which consumes relatively small amounts of energy, which comprises a small number of relatively simple parts, and which insures that the exposure time is invariably an accurate function of the prevailing scene brightness.

Another object of the invention is to provide a photographic apparatus wherein the shutter is opened and closed by electronic exposure control means and wherein the camera release must be actuated only for an interval of time which suffices to effect an opening of the shutter whereupon the circuit of the exposure control remains completed, even if the actuation of the camera release is terminated, to be automatically deenergized in response to completion of an exposure.

A further object of the invention is to provide novel and improved shutter-operating means for photographic apparatus.

An additional object of the invention is to provide a novel and improved automatic electronic exposure control for use in photographic apparatus.

The invention is embodied in a photographic apparatus which comprises a shutter having preferably ring-shaped and preferably concentric first and second setting members movable between first or cocked and second or uncocked positions (the cocking can take place in response to transport of the film and the uncocking is preferably effected by springs or other suitable biasing means), the shutter being respectively opened and closed in response to movement of the first and second members to their second positions (i.e., the length of the interval during which the shutter remains open depends on the delay with which the second member is permitted to move to its second position subsequent to movement of the first member to its second position), release means (such as a spring-biased reciprocable slide or the like) actuatable (preferably by hand) to move from a starting to an operative position, and an exposure control for effecting a movement of the first member to its second position in response to actuation of the release means and for thereupon effecting a movement of the second member to its second position with a variable delay which determines the exposure time.

The exposure control comprises an electric circuit having a first portion including electromagnet means having a permanent magnet core, an armature which normally assumes a first retaining position in which it holds the first member in its first position (whereby the first member preferably holds the second member in its first position) and is biased by the core to a second retaining position in which the armature holds the second member in its first position but permits the first member to move to its second position which results in opening of the shutter, and winding means energizable in response to actuation of the release means to assume a first condition of energization in which it cooperates with the core to move the armature to the second retaining position with the resulting opening of the shutter. The circuit further comprises a second portion which includes means for changing the condition of energization of the winding means with a delay which is a function of prevailing scene brightness so that the winding means then opposes the bias of the core (or at least fails to cooperate with the core) to thereby effect a movement of the second member to its second position whereby the shutter is closed.

The second portion of the circuit preferably comprises the aforementioned timer element including a capacitor and a photosensitive receiver.

The novel features which are considered as characteristic of the invention are set forth in particular in the appended claims. The improved photographic apparatus itself, however, both as to its construction and its move of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
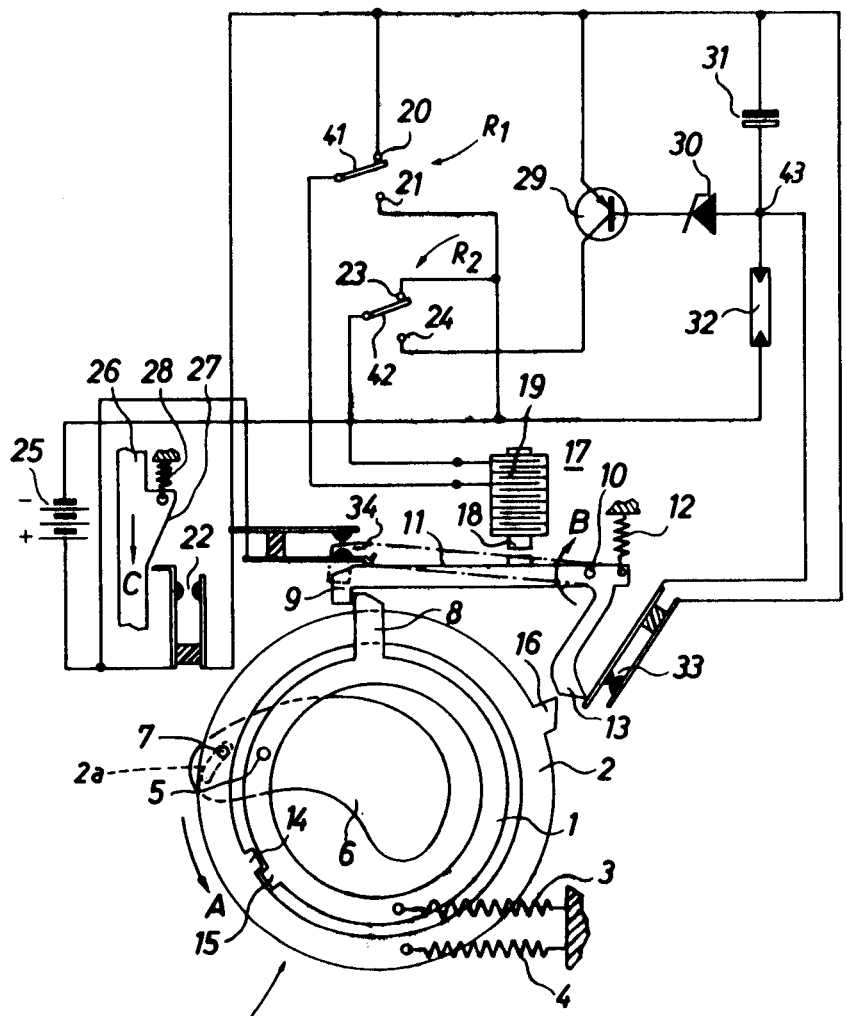
FIG. 1 is a diagrammatic fragmentary front elevational view of a still camera which embodies one form of the invention.

Referring first to FIG. 1, there is shown a portion of a still camera which comprises a shutter S having a ring-shaped shutter-opening first member 1 and a concentric ring-shaped shutter-closing second member 2. These members (hereinafter called rings for short) are shown in their first or cocked positions and are biased to their second or uncocked positions by helical springs 3, 4 which tend to rotate them in a counterclockwise direction (arrow A). The shutter S is closed when the rings 1, 2 simultaneously assume their first or second positions. The ring 1 carries pivot pins 5 for shutter blades 6 and each shutter blade 6 has a follower pin 7 which is received in a suitably configurated cam slot 2a of the ring 2. For the sake of clarity, FIG. 1 merely shows a single blade 6, a single pin 5, a single pin 7, and a single slot 2a. The means for moving the rings 1, 2 to the illustrated first positions forms no part of the present invention; for example, these rings can be cocked in response to actuation of the film-transporting mechanism to advance the film by the length of a frame. The ring 1 has an outwardly extending projection 15 and the ring 2 has an inwardly extending projection 14 which is engaged by the projection 15 when the ring 1 is moved to its first position so that the cocking of the ring 2 takes place automatically in response to cocking of the ring 1.

The camera further comprises a customary camera release element 26 which is actuatable by hand to move (arrow C) from the illustrated starting or idle position to a depressed or operative position and to thereby energize a first portion of an electric circuit which forms part of a novel exposure control. This first portion of the circuit includes an electromagnet 17 having an armature 11 which constitutes a two-armed lever pivotable on a fixed pin 10 and having a first arm provided with a tooth or projection 9 which normally engages a radially outwardly extending projection or arm 8 of the ring 1 to hold the latter in the illustrated first position. The ring 1 then holds the ring 2 in cocked position whereby the shutter S is closed. The armature 11 is biased in a counterclockwise direction by a helical spring 12 which normally maintains the tooth 9 in engagement with the arm 8 and which maintains a second arm of the armature 11 in the illustrated position in which the tip 13 of the second arm is adjacent to the path of movement of a projection or arm 16 on the ring 2. The illustrated position of the armature 11 is its first retaining position in which the armature prevents the ring 1 from moving toward its second position. When the armature 11 is pivoted in a clockwise direction (arrow B) against the opposition of the spring 12, it assumes a second retaining position in which the ring 1 is released and is free to move to its second position to thereby open the shutter S while the tip 13 of the second arm of the armature 11 holds the ring 2 against movement to its second position so that the shutter S remains open as long as the tip 13 is located in the path of the arm 16.

In accordance with a feature of the invention, the electromagnet 17 in the first portion of the electric circuit of the exposure control further comprises a permanent magnet core 18 which attracts the armature 11 and tends to pivot it to the aforementioned second retaining position but is too weak to overcome the action of the spring 12. The winding 19 of the electromagnet 17 surrounds the core 18 and is energized in response to actuation of the release element 26 to assume a first condition of energization in which it cooperates with the core 18 to attract the armature 11 and to thereby overcome the action of the spring 12. This enables the armature 11 to leave the illustrated first retaining position (with resulting opening of the shutter S in response to movement of the ring 1 to its second position) and to assume the second retaining position (shown by phantom lines) in which the tip 13 extends into the path of movement of the arm 16 and thus prevents a movement of the ring 2 to its second position (such movement of the ring 2 would result in closing of the shutter S).

The release element 26 is biased to its starting position by a return spring 28 and has an inclined cam face 27 which closes a master switch 22 in the first portion of the electric circuit in response to movement of the release element to its operative position. Such closing of the master switch 22 results in energization of the winding 19 in the aforedescribed manner, i.e., the magnetic flux produced by the winding 19 assists the magnetic flux of the permanent magnet core 18 to overcome the bias of the spring 12. The first portion of the electric circuit further includes two two-way relay switches R1, R2 which respectively comprise pairs of fixed contacts 20-21, 23-24 and movable contacts 41, 42. Prior to the making of an exposure, the movable contacts 41, 42 respectively engage the fixed contacts 20, 23. The contact 20 is connected with one contact of the master switch 22 and the contact 21 is connected with the negative pole of a source 25 of DC current, for example, a suitable battery. The contact 23 is connected to the negative pole of the battery 25 and the contact 24 is connected with the collector of a transistor 29 forming part of a second portion of the electric circuit. The movable contacts 41, 42 are connected to the terminals of the winding 19 in the electromagnet 17. One of these terminals is normally connected with the negative pole of the battery 25 by way of the movable contact 42 and contact 23. When the master switch 22 is closed by the cam face 27 of the release element 26, the other terminal of the winding 19 is connected with the positive pole of the battery 25 by way of the master switch 22, fixed contact 20 and movable contact 41.

The second portion of the electric circuit further comprises a Zener diode 30 which is connected between the base of the transistor 29 and a tap 43 between the photosensitive resistor 32 and the capacitor 31 of a timer element which determines the delay with which the tip 13 of the armature 11 releases the ring 2 for movement to its second position following release of the ring 1 by the tooth 9. Thus, the timer element determines the length of the exposure time. The emitter of the transistor 29 is connected with one contact of the master switch 22. The components 31, 32 of the timer element are connected in series and the resistor 32 is further connected with the negative pole of the battery 25 as well as with the fixed contacts 21, 23. The capacitor 31 is connected with the positive pole of the battery 25 in response to closing of the master switch 22. This capacitor is connected in parallel with a control switch 33 which is normally held in closed position by the tip 13 of the armature 11. The switch 33 is permitted to open when the armature 11 assumes its second retaining position in which it prevents a movement of the ring 2 to its second position.

The positions of the movable contacts 41, 42 are changed by the electromagnet 17 on energization of the winding 19, i.e., on closing of the master switch 22. The latter is in parallel with an auxiliary switch 34 which is normally open but closes in response to energization of the winding 19 on closing of the master switch 22 so that the user of the camera need not continue to maintain the release element 26 in operative position. It suffices to temporarily depress the release element 26 so as to close the master switch 22 for a short interval of time. The auxiliary switch 34 remains closed as long as the armature 11 dwells in its second retaining position which is indicated by phantom lines. The provision of the auxiliary switch 34 is of particular advantage in those situations when the nature of scene light requires a very long exposure time, for example, with the camera mounted on a tripod. In the absence of the auxiliary switch 34, the user would have to hold the release element 26 in operative position for the entire duration of the exposure time, even if the exposure time exceeds 1, 2 or more minutes.

THE OPERATION

The rings 1, 2 are moved to the illustrated first or cocked positions, for example, in response to transport of the film upon completion of an exposure. The master switch 22 is open and the winding 19 of the electromagnet 17 is deenergized so that the permanent magnet core 18 cannot overcome the bias of the spring 12 and the armature 11 dwells in the first retaining position in which its tooth 9 holds the arm 8 to retain the ring 1 in the first position. The ring 2 is held in its first position by the projection 15 of the ring 1. The springs 3, 4 store energy and tend to move the rings 1, 2 to their second or uncocked positions.

In order to make an exposure, the user of the camera depresses the release element 26 in the direction indicated by the arrow C whereby the cam face 27 closes the master switch 22 which energizes the first portion of the electric circuit in the exposure control by completing the circuit of the winding 19. The circuit of the winding 19 is completed from the positive pole of the battery 25, by way of the master switch 22, contacts 20, 41 of the relay switch R1, winding 19, contacts 42, 23 of the relay switch R2, and to the negative pole of the battery 25. This increases the magnetic flux in the core 18 to such an extent that the armature 11 is pivoted (arrow B) against the opposition of the spring 12 to release the arm 8 of the ring 1 and to move its tip 13 into the path of the arm 16 on the ring 2. The spring 3 immediately returns the ring 1 to its second position whereby the shutter S opens. The armature 11 dwells in its second retaining position and closes the auxiliary switch 34 so that the release element 26 can be permitted to return to its starting position under the action of the return spring 28 and to thus allow opening of the master switch 22. The direction in which the ring 1 rotates under the action of the spring 3 is indicated by the arrow A. The ring 2 remains in the first position of FIG. 1 because the armature 11 dwells in the phantom line second retaining position.

Energization of the winding 19 of the electromagnet 17 on closing of the master switch 26 results in movement of the contacts 41, 42 into engagement with the fixed contacts 21, 25 in a manner not shown in the drawing. The circuit of the winding 19 is then ready to be completed in the opposite direction, namely, by way of the emitter of the transistor 29. The operator can relax the finger pressure on the release element 26 as soon as the master switch 22 is closed for a very short interval of time.

When the armature 11 is pivoted to the phantom line second retaining position, the tip 13 of its right-hand arm opens the control switch 33 so that the capacitor 31 can be charged through the photosensitive receiver 32 which is exposed to scene light. After an interval of time which depends on the resistance of the receiver 32, and hence on scene brightness, the threshold voltage of the Zener diode 30 is exceeded and the transistor 29 begins to conduct current. Consequently, the circuit of the winding 19 is completed from the positive pole of the battery 25, by way of the auxiliary switch 34, transistor 29, contacts 24, 42 of the relay switch R2, winding 19, contacts 41, 21 of the relay switch R1, and to the negative pole of the battery. The winding 19 produces a magnetic flux which opposes the flux created by the core 18 whereby the spring 12 overcomes the opposition of the core and returns the armature 11 to the first retaining position in which the auxiliary switch opens 34 to open the circuit of the exposure control and the tip 13 releases the arm 16 of the ring 2 so that the latter returns to its second position under the action of the spring 4 and closes the shutter S. The capacitor 31 is discharged in automatic response to closing of the control switch 33. The movable contacts 41, 42 also return to their illustrated positions and the camera is ready for the next exposure as soon as the film is advanced by the length of a frame. As stated above, such transport of the film can effect a movement of the rings 1, 2 to their first or cocked positions.

An important advantage of the improved electromagnet 17 is that, when energized in response to actuation of the camera release element 26, the winding 19 strengthens the permanent magnetic field of the core 18, i.e., the parts 18, 19 cooperate to overcome the bias of the spring 12 and to move the armature 11 to the second retaining position. Also the electromagnet 17 thereupon changes the positions of the movable contacts 41, 42 in such a way that the winding 19 is connected to the second portion of the electric circuit (i.e., to the transistor 29 of such second portion). After a delay which is determined by the time constant of the timer element 31, 32, the transistor 29 begins to conduct current whereby the connections of the terminals of the winding 19 to the poles of the energy source 25 are reversed so that the winding 19 generates a magnetic field which does not assist the permanent magnetic field of the core and preferably opposes or counteracts such permanent magnetic field so that the spring 12 can overcome the action of the core and returns the armature 11 to its first retaining position. Thus, the improved exposure control utilizes a single electromagnet which can be used not only to effect an opening but also to effect a closing of the shutter S. The arm 8 of the ring 1 has an inclined face which temporarily lifts the tooth 9 of the armature 11 when the ring 1 is moved back to the illustrated first position. The tooth 9 thereupon engages the radial face of the arm 8 and holds the ring 1 in the first position until the release element 26 is actuated again, i.e., to the very moment when the user decides to make an exposure.

Figure 2:
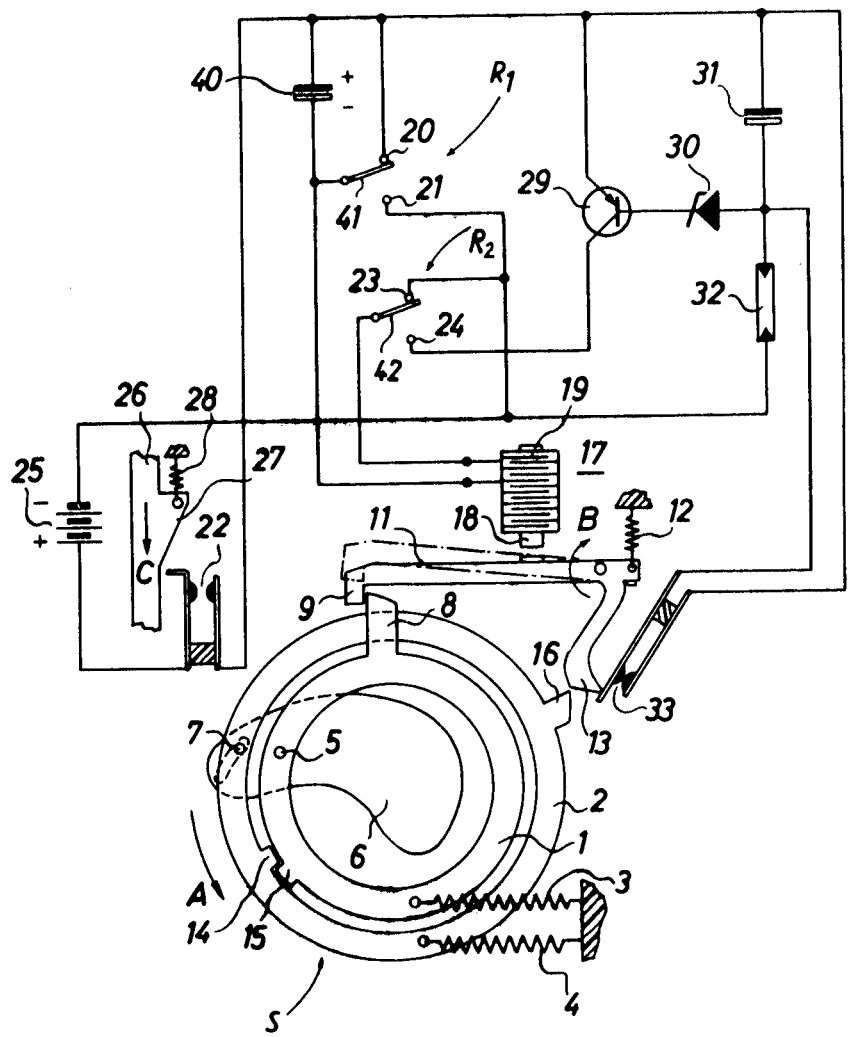
FIG. 2 is a similar fragmentary diagrammatic view of a modified still camera.

FIG. 2 illustrates a portion of a second camera wherein all such parts which are clearly analogous to the corresponding parts of the first camera are denoted by similar reference characters. The auxiliary switch 34 is replaced with a storage capacitor 40 one plate of which is connected with one terminal of the master switch 22 and the other plate of which is connected with the movable contact 41 of the relay switch R1.

The exposures are made in the same way as described in connection with FIG. 1. However, the storage capacitor 40 which is shunted by way of the contacts 20, 41 prior to opening of the shutter S is charged to the full potential of the battery 25 when the movable contact 41 engages the fixed contact 21. Thus, if the release element 26 is immediately permitted to return to the illustrated starting position, the fully charged capacitor 40 furnishes the current which is necessary for operation of the electric circuit. Since the load resistance of the circuit for the capacitor 40 is relatively high when the transistor 29 does not conduct current, the voltage drop at the capacitor 40 is rather small. Consequently, when the transistor 29 begins to conduct, the supply voltage for the winding 19 of the electromagnet 17 suffices to insure that the core 18 is compelled to release the armature 11 to the action of the spring 12 so that the armature can return to its first retaining position and enables the ring 2 to close the shutter S.

When the movable contacts 41, 42 respectively engage the fixed contacts 21, 24 (i.e., on energization of the winding 19), the storage capacitor 40 is connected in parallel with the remainder of the circuit.

The improved photographic apparatus is susceptible of many additional modifications without departing from the spirit of the present invention. For example, the auxiliary switch 34 of FIG. 1 need not be closed by the armature 11; it can be closed by the ring 1 when the latter is released for movement to its uncocked position. Furthermore, the Zener diode 30 can be omitted or replaced by an analogous electrical component. This diode is preferred at the present time because, if properly selected, it determines with a high degree of accuracy that voltage which causes the transistor 29 to conduct current and to complete the circuit of the winding 19 in a direction that the winding then creates forces which reduce the bias of the core 18 upon the armature 11 so that the latter can pivot under the action of the spring 12.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a shutter having first and second members movable between first and second positions, said shutter being respectively opened and closed in response to movement of said first and second members to their second positions; release means actuatable to move from a starting position to an operative position; and an exposure control for effecting a movement of said first member to its second position in response to actuation of said release means and thereupon said second member to its second position with variable delay which determines the exposure time, comprising an electric circuit having a first portion including electromagnet means having a permanent magnet core, an armature which normally assumes a first retaining position wherein it holds said first member in its first position and is biased by said core to a second retaining position wherein it holds said second member in its first position while releasing said first member for movement to its second position and winding means energizable in response to the actuation of said release means to assume a first condition of energization in which it cooperates with said core to move the armature to said second retaining position with the resulting opening of said shutter, said circuit further having a second portion including means for changing the condition of energization of said winding means with a delay which is a function of scene brightness so that said winding means then ceases to cooperate with said core to thereby effect a movement of said movement of said second member to its second position whereby the shutter is closed.

2. A combination as defined in claim 1, wherein said electric circuit further comprises a source of DC current and said means for changing the condition of energization of said winding means comprises a timer element having capacitor means in series with photosensitive receiver means which is exposed to scene light.

3. A combination as defined in claim 1, wherein said armature comprises a lever which is pivotable between said first and second retaining positions, said lever having a first portion which holds said first member in its first position in the first retaining position of said lever and a second portion which holds said second member in its second position in the second retaining position of said lever.

4. A combination as defined in claim 1, wherein said winding means in the first condition of energization thereof strengthens the magnetic flux in said core and weakens such magnetic flux in the second condition of energization thereof.

5. A combination as defined in claim 1, wherein said first portion of said circuit further comprises switch means actuatable by said electromagnet means.

6. A combination as defined in claim 1, wherein said armature comprises a two-armed lever which is pivotable between said first and second retaining positions and further comprising means for biasing said lever to the first retaining position with a force which is stronger than the bias of said core in the changed condition of energization of said winding means and when said winding means is deenergized.

7. A combination as defined in claim 6, wherein one arm of said lever has a projection which holds said first member in its first position in the first retaining position of said lever and the other arm of said lever comprises a portion which holds the second member in its first position in the second retaining position of said lever.

8. A combination as defined in claim 1, wherein the first member of said shutter comprises means for holding said second member in the first position while said first member dwells in its first position.

9. A combination as defined in claim 1, wherein said second member has a first projection and said first member has a second projection which engages said first projection to move said second member from its second to its first position in response to movement of said first member from its second to its first position.

10. A combination as defined in claim 1, wherein the first member of said shutter has a first projection and said armature has a second projection which is located in the path of said first projection to hold said first member against movement from its first to its second position in the first retaining position of said armature.

11. A combination as defined in claim 1, wherein in said electric circuit further comprises a source of DC current having a positive and a negative pole, said winding means having first and second terminals and said first portion of said circuit further comprising adjustable first and second two-way switch means which respectively connect said first and second terminals with the positive and negative poles of said source in response to actuation of and release means, said switch means being adjustable by said electromagnet means in the first condition of energization of said winding means to thereby partially complete the circuit of said winding means so that said first and second terminals are respectively connected with the negative and positive poles of said source.

12. A combination as defined in claim 11, wherein said second portion of said circuit comprises transistor means arranged to complete the circuit of said winding means to thus effect said change in the condition of energization of said winding means in adjusted positions of said switch means with a delay which is a function of scene brightness.

13. A combination as defined in claim 12, wherein said second portion of said electric circuit further comprises capacitor means, photosensitive receiver means exposed to scene light and in series with said capacitor means, and a Zener diode connected to the base of said transistor means and to a tap between said capacitor means and said receiver means.

14. A combination as defined in claim 13, wherein said capacitor means and said receiver means constitute a timer element which determines said delay.

15. A combination as defined in claim 1, wherein said first portion of said electric circuit further comprises adjustable switch means for directly connecting said winding means to an energy source, said switch means being adjustable by said electromagnet means in the first condition of energization of said winding means to thereby indirectly connect said winding means to the source, said circuit further comprising storage capacitor means connected in parallel with said first and second portions in the adjusted positions of said switch means.

16. A combination as defined in claim 1, wherein said first portion of said electric circuit further comprises a master switch which is closed on actuation of said release means and an auxiliary switch connected in parallel with said master switch and arranged to close in response to energization of said winding means.

17. A combination as defined in claim 16, wherein said auxiliary switch is normally open and is closed by said armature in response to movement from the first to second retaining position thereof.

18. A combination as defined in claim 1, wherein said circuit further comprises a source of DC current having positive and negative poles and said second portion of said circuit comprises a transistor, said first portion of said circuit further including a first relay switch having a first contact connected with one of said poles, a second contact connectable with the other of said poles, and a third contact movable by said electromagnet means from the one to the other of said first and second contacts and connected with one terminal of said winding means, and a second relay switch having a first contact connected with said one pole, a second contact connected to the collector of said transistor, and a third contact connected with the other terminal of said winding means and movable by said electromagnet means from the one to the other of the first and second contacts of said second relay switch.

* * * * *